US006992619B2

(12) United States Patent
Harrison

(10) Patent No.: US 6,992,619 B2
(45) Date of Patent: Jan. 31, 2006

(54) USE OF GLOBAL POSITIONING SATELLITES (GPS) TO DISCOVER AND SELECT LOCAL SERVICES

(75) Inventor: Edward R. Harrison, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/633,073

(22) Filed: Aug. 1, 2003

(65) Prior Publication Data

US 2005/0024264 A1 Feb. 3, 2005

(51) Int. Cl.
*G01S 5/14* (2006.01)
*H04Q 7/20* (2006.01)

(52) U.S. Cl. ............................ 342/357.13; 455/186.1; 455/440

(58) Field of Classification Search ........... 342/357.13; 455/186.1
See application file for complete search history.

(56) References Cited

U.S. PATENT DOCUMENTS

| | | | | |
|---|---|---|---|---|
| 5,152,012 | A * | 9/1992 | Schwob | 455/158.5 |
| 5,635,940 | A * | 6/1997 | Hickman et al. | 342/389 |
| 5,864,753 | A * | 1/1999 | Morita et al. | 455/186.1 |
| 6,167,268 | A * | 12/2000 | Souissi et al. | 455/434 |
| 6,282,412 | B1 * | 8/2001 | Lyons | 455/186.1 |
| 6,501,421 | B1 * | 12/2002 | Dutta et al. | 342/357.13 |
| 2001/0044284 | A1 * | 11/2001 | Odashima et al. | 455/186.1 |
| 2003/0013425 | A1 * | 1/2003 | Nee | 455/186.1 |
| 2003/0032399 | A1 * | 2/2003 | Slupe | 455/161.2 |
| 2003/0032400 | A1 * | 2/2003 | Tsubaki et al. | 455/186.1 |
| 2003/0040272 | A1 * | 2/2003 | Lilievre et al. | 455/3.06 |
| 2004/0107046 | A1 * | 6/2004 | Zink et al. | 701/207 |

* cited by examiner

*Primary Examiner*—Gregory C. Issing
(74) *Attorney, Agent, or Firm*—David N. Tran

(57) ABSTRACT

A method and an apparatus for associating location information corresponding to a geographic location with information about services available at the geographic location. The information may be stored in a database for subsequent use.

11 Claims, 10 Drawing Sheets

300

| Location | Service #1 | Service #2 | Service #3 |
|---|---|---|---|
| A | Lowest Cost<br>Lowest BW<br>Lowest Signal | Highest Cost<br>Highest BW<br>Medium Signal | Medium Cost<br>Medium BW<br>Highest Signal |
| B | Highest Cost<br>Lowest BW<br>Lowest Signal | Lowest Cost<br>Highest BW<br>Highest Signal | N/A<br>N/A<br>N/A |

USE OF GLOBAL POSITIONING SATELLITES (GPS) TO DISCOVER AND SELECT LOCAL SERVICES

FIELD OF THE INVENTION

The present invention relates generally to the field of geographic positioning systems and, more particularly, to a method and apparatus for discovering services using a positioning system.

BACKGROUND OF THE INVENTION

Positioning system is used to determine position information. The positioning system may be a Global Positioning Satellites (GPS) system and may be provided by the United States Department of Defense (DOD) and other satellite tracking systems to help determine the position information. GPS may also be provided by Russia or countries in Europe. GPS is based on a number of orbiting satellites that broadcast signals to a number of GPS receivers. The signals broadcast from the satellites may include the identity and position of the satellite that broadcasts the signals. In addition, the signals may include time when the signals were broadcast. There may be other positioning systems that can augment GPS to provide better position inside buildings.

A GPS receiver may use this information to calculate its position (latitude and longitude), altitude, velocity, heading and precise time of day using signals received from at least four GPS satellites. Each GPS satellite may broadcast or transmit two signals, an L1 signal and an L2 signal. The L1 signal may be modulated with two pseudo-random noise codes, the protected code and the course/acquisition (C/A) code. Each GPS satellite may have its own unique pseudo-random noise code. Civilian navigation GPS receivers may only use the C/A code on the L1 frequency.

FIG. 1 illustrates one example of a prior art positioning system. Positioning system 100 may be a GPS and may include a GPS receiver 110 and four GPS transmitters or satellites 120A, 120B, 120C and 120D. There may be multiple GPS receivers and multiple GPS transmitters. The GPS receiver 110 may receive information from the GPS transmitters 120A, 120B, 120C and 120D, and uses the information to determine its position with respect to GPS the transmitters 120A, 120B, 120C and 120D. The GPS receiver 110 may measure the time required for the broadcast signal to travel from the GPS transmitters 120A–120D to the GPS receiver 110. This may include the GPS receiver 110 generating its own pseudo-random noise code identical to each GPS transmitter's code and precisely synchronizing the two codes to determine how long the GPS transmitter's code takes to reach the GPS receiver 110. By performing the process with at least four GPS transmitters 120A–120D, error in the calculation of position and time may be reduced. As the GPS receiver 110 moves around, the position of the GPS receiver 110 may be re-calculated.

BRIEF DESCRIPTION OF THE DRAWINGS

The present invention is illustrated by way of example, and not limitation, in the figures of the accompanying drawings in which.

DETAILED DESCRIPTION

For one embodiment, a method and an apparatus for using a positioning system to locate network services is described. Location information about a geographic location may be provided by the positioning system. The location information may be associated with information about available network services at or near that geographic location.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. There are several different ways to implement an independent positioning system. Several embodiments are described herein. However, there are other ways that would be apparent to one skilled in the art that may be practiced without specific details.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below.

Computer System with Positioning Receiver

Figure 1:
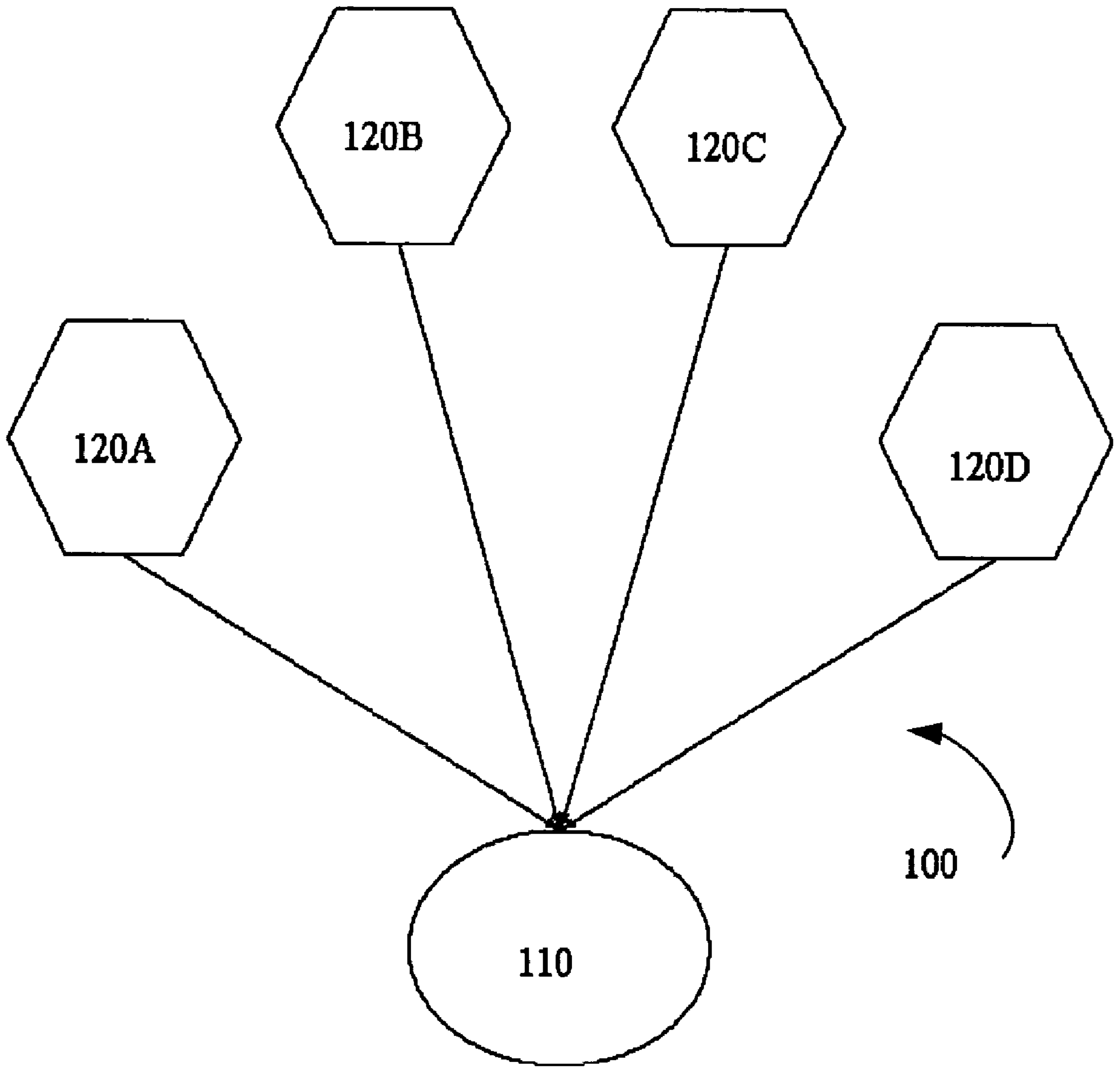
FIG. 1 illustrates one example of a prior art positioning system.
Figure 2A:
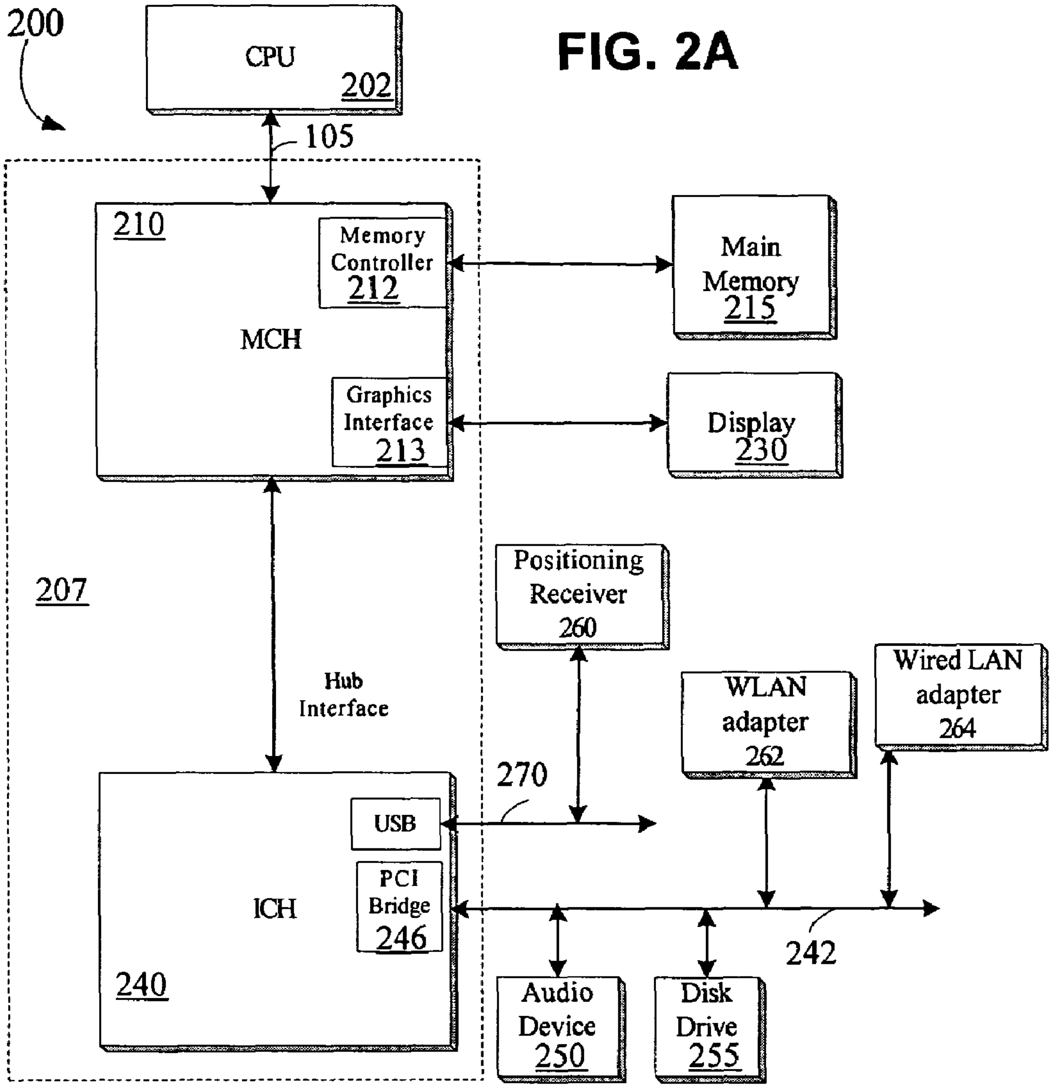
FIG. 2A illustrates one example of a computer system used to determine location information, according to one embodiment.

FIG. 2A illustrates one example of a computer system used to determine location information, according to one embodiment. Computer system 200 may be a mobile computer system and may include a positioning receiver 260 such as, for example, a GPS receiver. The positioning receiver 260 may be a radio frequency (RF) receiver and may be coupled to an antenna (not shown), which may receive signals used to determine location information. The signals may be satellite signals broadcast by GPS transmitters (not shown). The antenna may be a dipole antenna, a shot antenna, a dual antenna, an omni-directional antenna, a loop antenna or any other suitable antenna type. The computer system 200 may include analog-to-digital (A/D) converter logic to convert the received signals to digital form.

Computer system 200 may include a central processing unit (CPU) 202 and may receive its power from an alternating current (AC) power source or a direct current (DC) power source such as, for example, a battery. The CPU 202 may be coupled to a bus 205. The CPU 202 may be a processor manufactured by, for example, Intel Corporation of Santa Clara, Calif. Chipset 207 may be coupled to the bus 205. The chipset 207 may include a memory control hub (MCH) 210.

The MCH 210 may include a memory controller 212 that is coupled to system memory 215 (e.g., random access memory (RAM), read-only memory (ROM), etc.). The system memory 215 may store data and sequences of instructions that are executed by the CPU 202 or any other processing devices included in the computer system 200. The MCH 210 may include a graphics interface 213. A display 230 may be coupled to the graphics interface 213. Typically, the display 230 is a liquid crystal display (LCD). Other display technologies (e.g., organic light-emitting diode (OLED) display) may also be used. Although not shown, there may be logic to translate a digital representation of an image stored in a storage device such as video memory or system memory into display signals that may be interpreted and displayed by the display 230.

The chipset 207 may also include an input/output control hub (ICH) 240. The ICH 240 may be coupled with the MCH 210 via a hub interface. The ICH 240 may provide an interface to input/output (I/O) devices within the computer system 200. The ICH 240 may be coupled to a peripheral bus (e.g., Peripheral Component Interconnect (PCI) bus). Thus, the ICH 240 may include a PCI bridge 246 that provides an interface to a PCI bus 242. The PCI bridge 246 may provide a data path between the CPU 202 and peripheral devices (not shown). An audio device 250 and a disk drive 255 may be connected to the PCI bus 242. Although not shown, other devices may also be connected to the PCI bus 242. The ICH 240 may also be coupled to a universal serial bus (USB) 270. For one embodiment, the positioning receiver 260 (e.g., a GPS receiver) may be connected to the USB 270. One skilled in the art may recognize that other devices (e.g., keyboard, mouse, etc.) may also be connected to the USB 270. Other methods may be used to connect the positioning receiver 260 to the ICH 240.

Figure 2B:
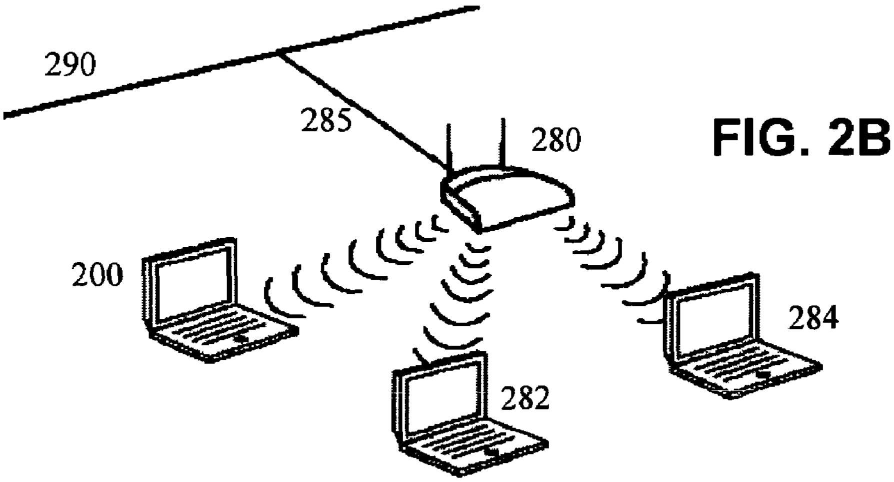
FIG. 2B illustrates one example of an access point, according to one embodiment.

FIG. 2B illustrates one example of an access point, according to one embodiment. For one embodiment, the computer system 200 may include one or more network adapters or modules. For example, the computer system 200 may include a wireless local area network (WLAN) adapter 262 to allow it to establish a wireless connection to a LAN 290 via an access point 280. The access point 280 may support multiple computer systems 200, 282, and 284 and may be connected to the LAN 290 via a cable 285. The access point 280 may serve as a hub to receive, buffer and transmit data between the computer systems 200, 282 and 284 and the LAN 290. The LAN 290 may then be used by the computer system 200 to connect to the Internet (not shown). For one embodiment, the computer system 200 may also include a wired LAN adapter 264 to establish a wired connection to the LAN 290 and then to the Internet. For one embodiment, the computer system 200 may also include a General Packet Radio Service (GPRS) adapter (not shown) to allow it to establish a wireless wide area network (WWAN) connection to a GPRS network (not shown) and then to the Internet. The GPRS adapter may include a subscriber identity module (SIM) for authentication purpose.

Network Services Discovery

Depending on where the computer system 200 is positioned, there may be zero or more network services that the computer system 200 may be connected to. Typically, the determination of what network services are available is performed by a process referred to as discovery. The process may be performed automatically, or it may be performed in response to a command. For example, when the computer system 200 is positioned near one corner of a town, the discovery process may find one network service available at a nearby coffee shop and another competing network service available at a nearby fast food restaurant. In this example, when lowest cost is one of the criteria and having a highest priority, and the network service available at the nearby coffee shop is less expensive than the network service available at the nearby fast food restaurant, the network service available at the coffee shop is preferred. At another corner of the same town, the network service available at a similar fast food restaurant may be preferred because there may not be any other network service available.

Normally, the discovery process may be performed from a particular geographic location whenever a network service is desired, regardless of whether a similar discovery may have been previously performed from the same general location. The discovery process may be time consuming because it may often require user intervention which may be manual. Referring to the example described above, a month after determining that the network service available at the coffee shop is preferred because it is less expensive than the network service available at the nearby fast food restaurant, the discovery process may again be performed, and the discovery result may end up being the same. Because the discovery process may be time consuming for the user, it may be undesirable to repeat the discovery process when the computer system 200 is positioned in the same general location where the discovery process was previously performed.

Storing of Discovered Network Services

For one embodiment, the positioning receiver 260 may be used to determine the location information corresponding to the geographic location of the computer system 200. For another embodiment, the computer system 200 may associate information about the discovered network services with the location information and stored them for subsequent use. Each discovered network services may have different characteristics relating to, for example, cost, bandwidth, signal strength, etc.

The computer system 200 may store the information about the discovered network services and the associated location information in a local storage area using, for example, one or more of the disk drive 205 and the memory 215. This may be implemented in a form of a database. Alternatively, the information about the discovered network services and the associated location information may be stored in a shared storage area so that it may be used by other computer systems. The shared storage area may be, for example, a remote storage area available in a network. For one embodiment, one or both of the local and remote storage areas may be used. For another embodiment, the discovery process may be performed automatically whenever the computer system 200 is positioned at a new location, regardless of whether a connection is desired. Automatic discovery may provide the computer system 200 the ability to anticipate that the user of the computer system 200 may want to establish a connection. This may be advantageous considering that it may be time consuming for the user to manually establish a connection.

Selection of Stored Network Services

For one embodiment, the computer system 200 may include service selection logic that may select a network service based on a certain criteria. The criteria may include default values or they may be determined by a user of the computer system 200. For example, the user using the computer system 200 may indicate that it is preferable to have a connection established using cost as a first criterion and bandwidth as a second criterion. When two network services available from a geographic location have the same cost structure, the service selection logic may apply the second criterion and select the network service having the higher bandwidth. Alternatively, the one or more criteria may be determined based on frequency or pattern of prior usage.

Figures 3A, 3B:
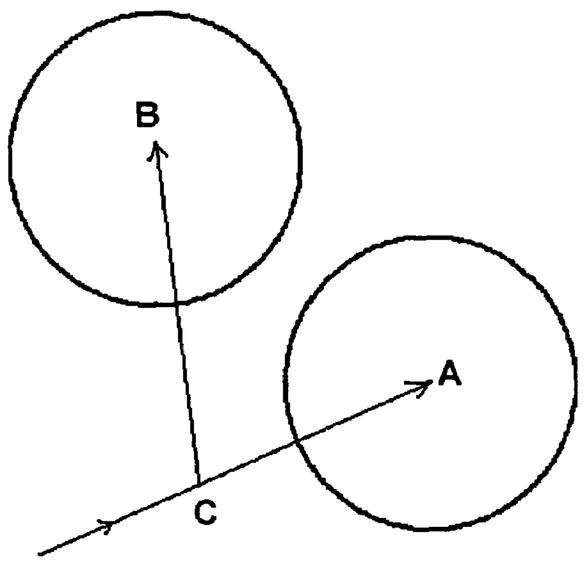
FIG. 3A illustrates one example of the positioning information and associated network services information that may be stored by the computer system, according to one embodiment.
FIG. 3B is a block diagram illustrating one example of automatic connection setup based on anticipation, according to one embodiment.

FIG. 3A illustrates one example of the positioning information and associated network services information that may be stored, according to one embodiment. Table 300 in this example includes a field for location (e.g., locations A, B, etc.) and a field for each of the discovered network services (e.g., service #1, service #2, service #3, etc.) associated with each location. Information about each network service may also be stored in the table 300. This information may include, for example, cost, bandwidth, signal strength, etc. For one embodiment, the information about each network service is compared against one another so that they can be quickly selected by the service selection logic. For example, at the location A, service #1 is lowest in cost and service #2 is highest in cost. Different locations may have different number of available network services. For example, there are only two network services available at location B when there are three at location A. One skilled in the art will recognize that there may be other information about the network services that may be stored in the database, and that other arrangements may be used to enable the service selection logic to select a network service from the database.

For another embodiment, the service selection logic may recommend moving the computer system 200 to a different location based on the criteria. Using the example illustrated in FIG. 3A, when the current location is A, and cost is a criterion, in addition to selecting the service #1 because of its lowest cost, the service selection logic may also recommend moving the computer system 200 to the location B, which may be one block away. This may be because the service selection logic determines that by moving the computer system 200 to the location B, the service #2 may be available at an even lower cost. Depending on the requirement, the criteria may be changed such that a different network service may be selected from the same geographic location. For example, when the computer system 200 is at the location A, and the criterion is changed from cost to signal strength, the service #3 may be selected. For one embodiment, when the service selection logic selects a network service, connection to the selected network service may be established automatically.

For one embodiment, the service selection logic may use the location information corresponding to a current geographic location and the location information stored in the database to anticipate a connection at another geographic location. FIG. 3B is a block diagram illustrating one example of automatic connection setup based on anticipation, according to one embodiment. One attribute of GPS is that the movement direction is provided. For one embodiment, based on the movement direction, the service selection logic may automatically anticipate that the computer system 200 is moving from one location to another location (e.g., from the location C toward the location A). The service selection logic may then perform necessary set up to establish a connection from the location A, even though the computer system 200 may not yet be physically at the location A. For example, the computer system 200 may include two WLAN adapters, the first one used for a network connection from the location C and the second one used to set up a network connection from the location A. When the computer system 200 reaches the location A, the connection using the first WLAN adapter may be switched to the second WLAN adapter seamlessly. Referring to FIG. 3B, for one embodiment, the service selection logic may recommend moving the computer system 200 from one location to another location (e.g., from the location C to the location A) to get better services. Better services may include, for example, stronger signal, higher bandwidth, lower cost, etc. Note that depending on the criteria, the service selection logic may recommend moving from the location C to the location B rather than to the location A. The recommendation may be made using voice, text or graphics such as the example illustrated in FIG. 3B where a directional arrow points from the location C to the location A.

Radio Systems with Positioning Receiver

Figure 4A:
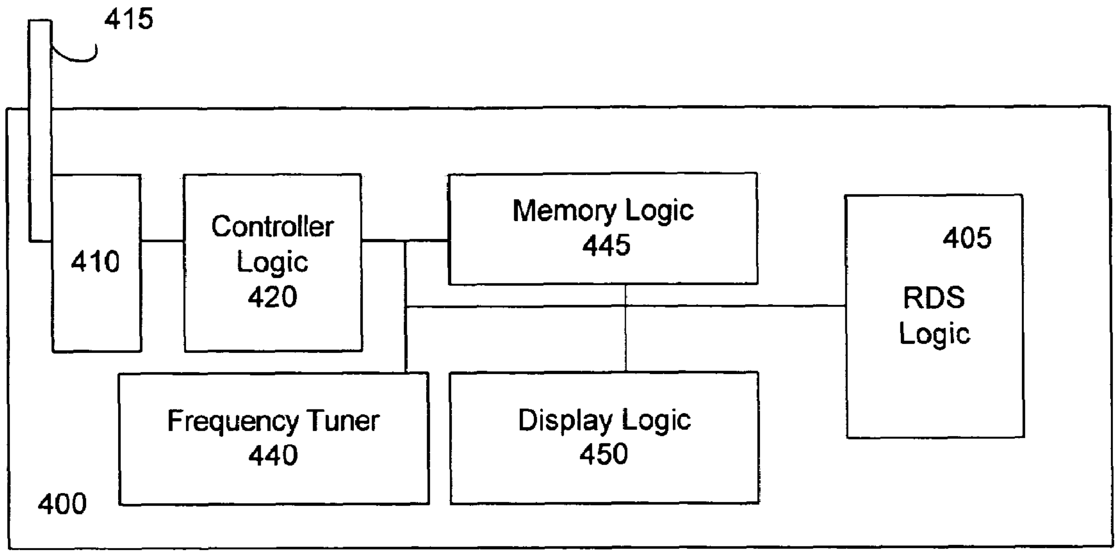
FIG. 4A is a block diagram illustrating one example of a radio system, according to one embodiment.

FIG. 4A is a block diagram illustrating one example of a radio system, according to one embodiment. For one embodiment, the radio system 400 may include a positioning receiver 410 to determine location information corresponding to a particular geographic location. The positioning receiver 410 may be a GPS receiver and may include an antenna 415 to receive broadcast GPS information. The radio system 400 may also include controller logic 420, a frequency tuner 440, memory logic 445, and display logic 450. The display logic 450 may be coupled to a display (not shown) to display the broadcast information. The controller logic 420 may include logic to convert the broadcast information so that it may be processed by the controller logic 420 and the display logic 450.

For one embodiment, the controller logic 420 may also include logic to identify and remember the radio station and/or frequency that the radio system 400 is frequently tuned to. Thus, the controller logic 420 may learn from prior usage patterns to come up with a prediction that the same behavior may occur next time. For example, the controller logic 420 may recognize that the radio system 400 is frequently tuned to a station that broadcasts its program at frequency FM 101.3 and may save that information in the memory logic 445 along with the location information. The next time the radio system 400 is at the same location, the frequency tuner 440 may automatically tuned the radio system 400 to the same frequency. For one embodiment, the controller logic 420 may automatically change button mapping on the radio system 400 whenever the radio system 400 is at a different location to match with the information stored in the memory logic 445. For another embodiment, the controller logic 420 may offer a channel associated with a radio station to the user by voice or text.

Radio Data Service (RDS) is a technology that enables information such as, for example, text to be displayed on RDS-enabled radio systems. The information may be broadcast by multiple radio stations and may include type of programming (e.g., country, classical, rock, etc.), names of songs and artists, news, weather, advertisement, etc. For one embodiment, the radio system 400 may include RDS logic 405 to enable it to become an RDS-enabled radio system. The controller logic 445 may then store information about a radio station that offers, for example, a program that matches with one or more criteria in the memory logic 445. The controller logic 445 may also store the location information corresponding to the geographic location where the program can be received. The one or more criteria may be entered by a user of the radio system 400, or it may be learned by the radio system 400 based on, for example, the type of radio stations and programs that the radio system 400 is frequently tuned to.

Figure 4B:
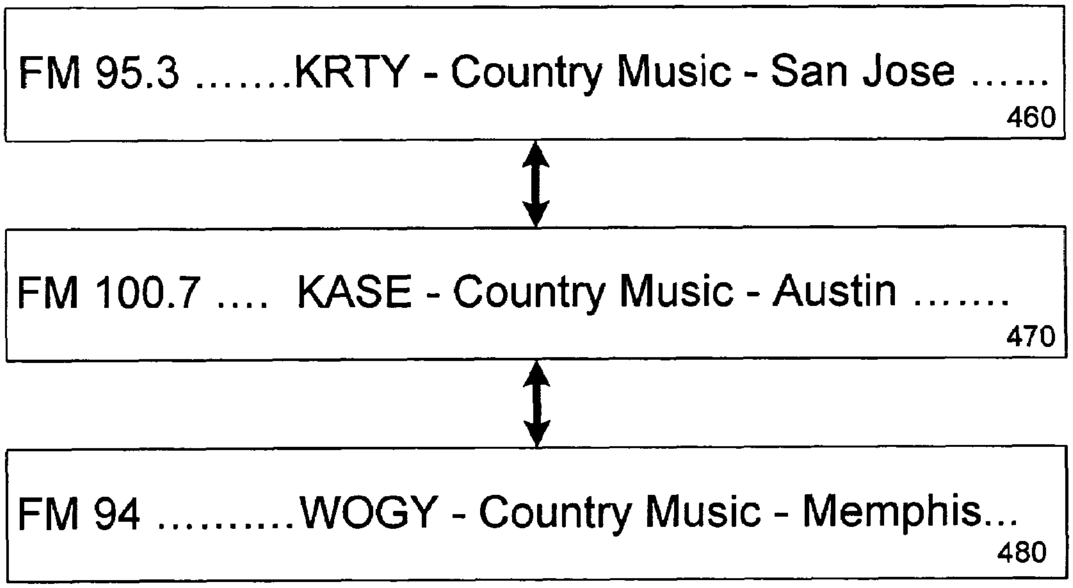
FIG. 4B illustrates one example of storing location information with RDS programming information, according to one embodiment.

FIG. 4B illustrates one example of storing programming information and associated location information, according to one embodiment. The positioning receiver 410 may recognize when the radio system 400 is moved to a new location. For one embodiment, when the radio system 400 is moved to a new location, the controller logic 420 may screen the information broadcast by radio stations at or near the new location to find programs similar to the one stored in the memory logic 445. The controller logic 420 may then select an appropriate radio station and may automatically tune the radio system 400 to the selected radio station. For example, referring to FIG. 4B, when the stored programming information is country music, the controller logic 420 may screen the broadcast information and may automatically tune the radio system 400 to radio station KRTY at frequency FM 95.3 when in San Jose (460). The controller logic 420 may also screen the broadcast information and may tune the radio system 400 to radio station KASE at frequency FM 100.7 when in Austin (470). Similarly, the radio system 400 may be tuned to radio station WOGY at frequency FM 94 when in Memphis (480). It may be noted that, in the current example, the next time the radio system 400 is in San Jose, the controller logic 445 may still have to screen the broadcast information. It may be possible that the controller logic 445 may find a different radio station having better signal strength than the radio station FM 95.3 and also offering country music programming.

For one embodiment, the location information and the information about the selected radio station that broadcasts the desired programming may be stored in the memory logic 445 for subsequent use. This may enable the controller logic 445 to quickly tune the radio system 400 to the desired radio station without having to screen the broadcast information. Referring to FIG. 4B, the bi-directional arrows between blocks 460, 470 and 480 are used to illustrate that the controller logic 420 may automatically select the radio stations shown whenever the radio system 400 is moved from one location to another location. By storing the information about the selected radio station, it is more likely that the next time the radio system 400 is in the San Jose area, the controller logic 445 may tune the radio system 400 to the radio station broadcasting on the FM 95.3 frequency. One skilled in the art may recognize that other broadcast information may also be used to associate with the location information.

Although the examples above refer to using the positioning receiver with a mobile computer system and with a radio system, one skilled in the art may also recognize that the techniques described may also be applicable when using the positioning receiver with other electronic devices to associate the location information with the desired information available at different geographic locations.

Process Diagrams

Figure 5:
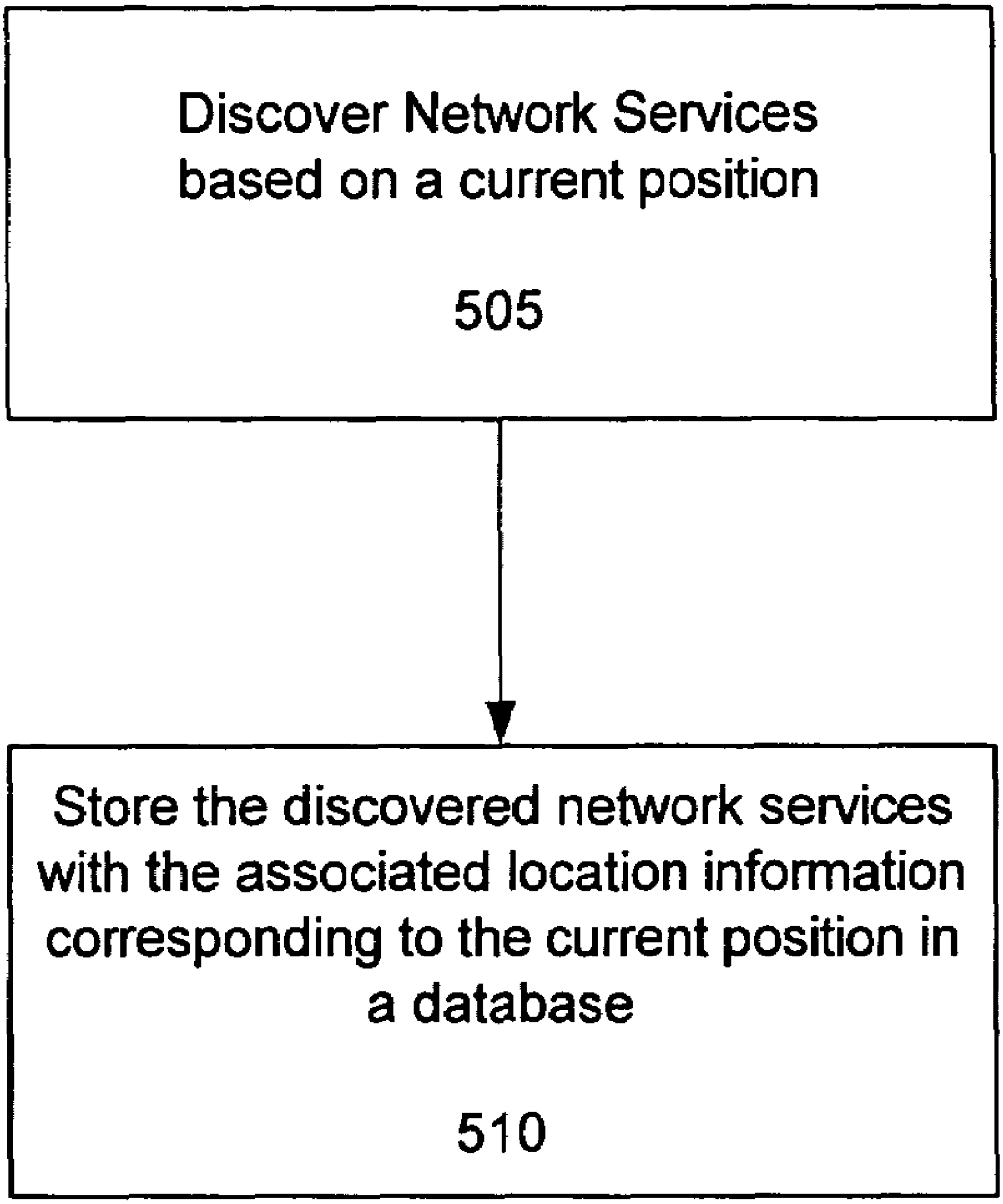
FIG. 5 illustrates a flow chart of a process of determining a position of a transceiver.

FIG. 5 is a flow diagram illustrating one example of a network service discovery process, according to one embodiment. A positioning receiver is used to determine the location information corresponding to a current position. At block 505, network services available at the current position are discovered. For one embodiment, if one or more network services are discovered, these network services and the location information corresponding to the current position are stored in a database, as shown in block 510. When there is no network service discovered, no information relating to the current position is stored in the database. Alternatively, the location information corresponding to the current position is stored in the database but there is no network services associated with the location information.

Figure 6:
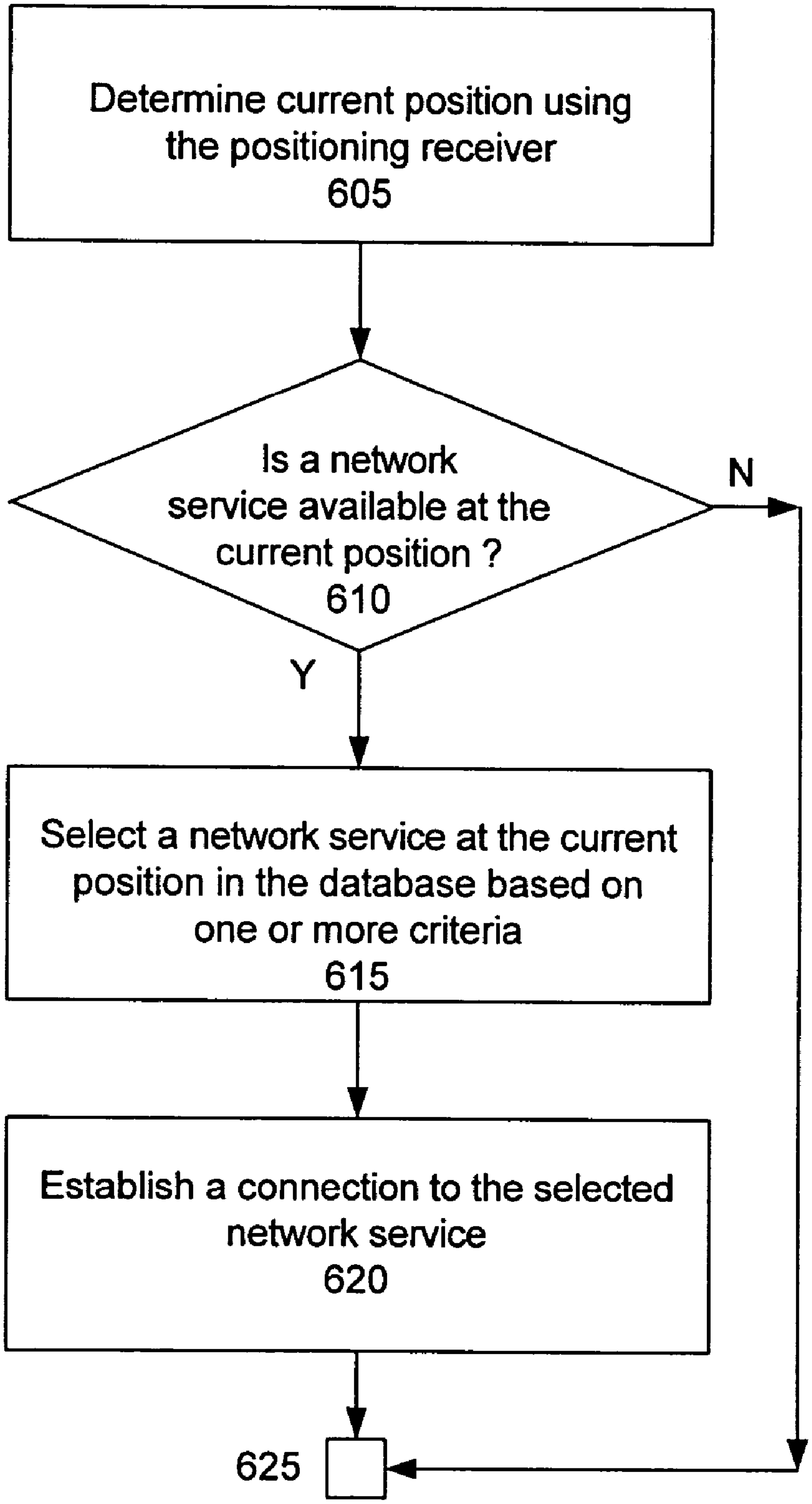
FIG. 6 illustrates a flow chart of an alternative process of determining a position of a transceiver.

FIG. 6 is a flow diagram illustrating one example of a network service selection process, according to one embodiment. At block 605, the location information corresponding to the current position is determined. At block 610, a test is made to determine if the database includes any network service information relating to the current position. If there is such information stored in the database, the process flows to block 615 where a network service is selected. It may be possible that there may be multiple network services available at the current position. The network service may be selected based on one or more criteria (e.g., cost, bandwidth, etc.). At block 620, a connection using the selected network service is performed. The process then flows to block 625. From block 610, if there is no network service information in the database, the process flows to block 625.

Figure 7:
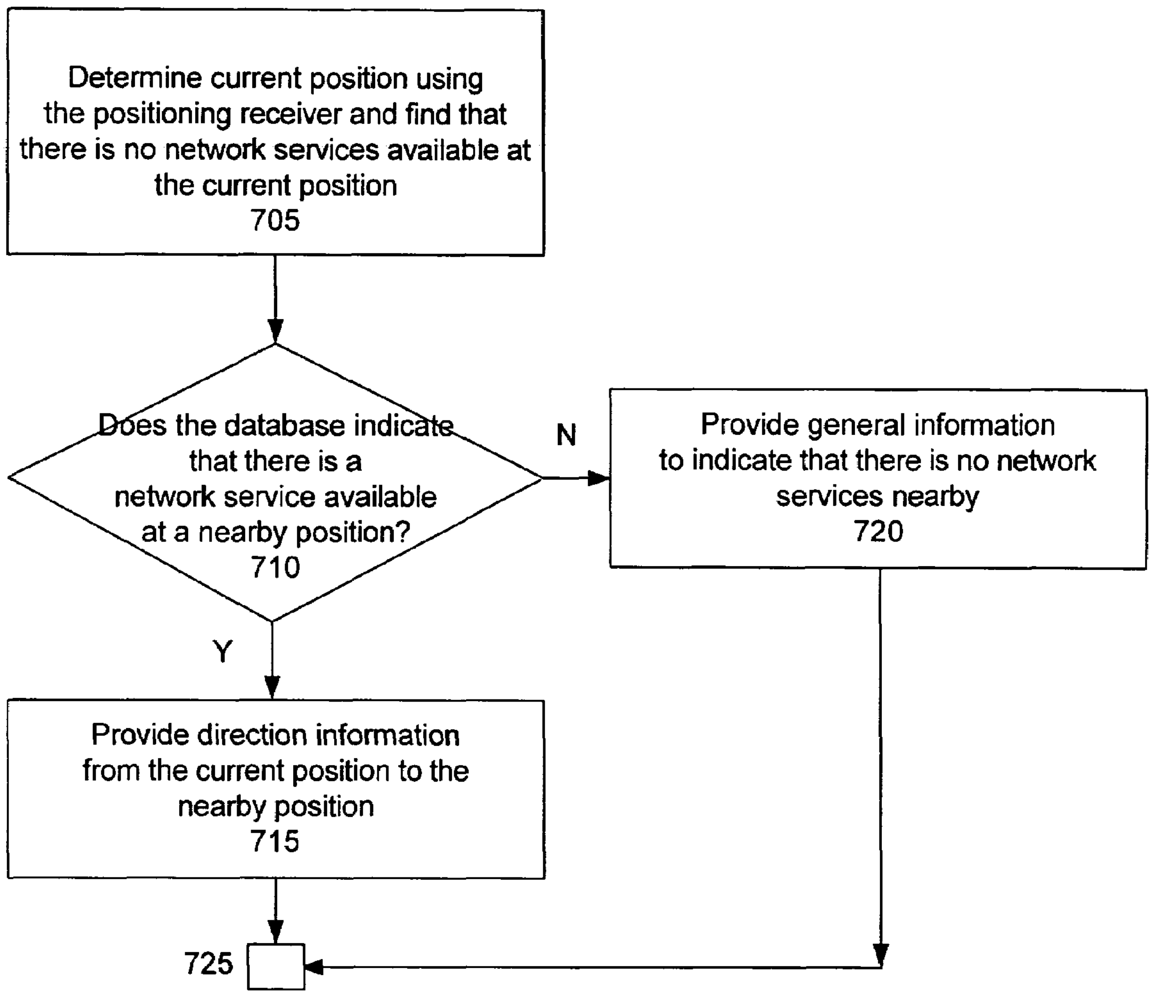
FIG. 7 is a flow diagram illustrating one example of a process that provides direction information, according to one embodiment.

FIG. 7 is a flow diagram illustrating one example of a process that provides direction information, according to one embodiment. In this example, it has been determined that there is no network services available at the current position, as shown in block 705. At block 710, a test is made to determine if the database indicates that a nearby position may be a better place because to network services may be available there. From block 710, if there is such a nearby position, the process flows to block 715 where direction to the nearby position is provided. The process then continues to block 725. From block 710, when there is no nearby position, some type of informational messages may be provided to indicate that there is no position nearby where there is any available network service, as shown in block 720.

Figure 8:
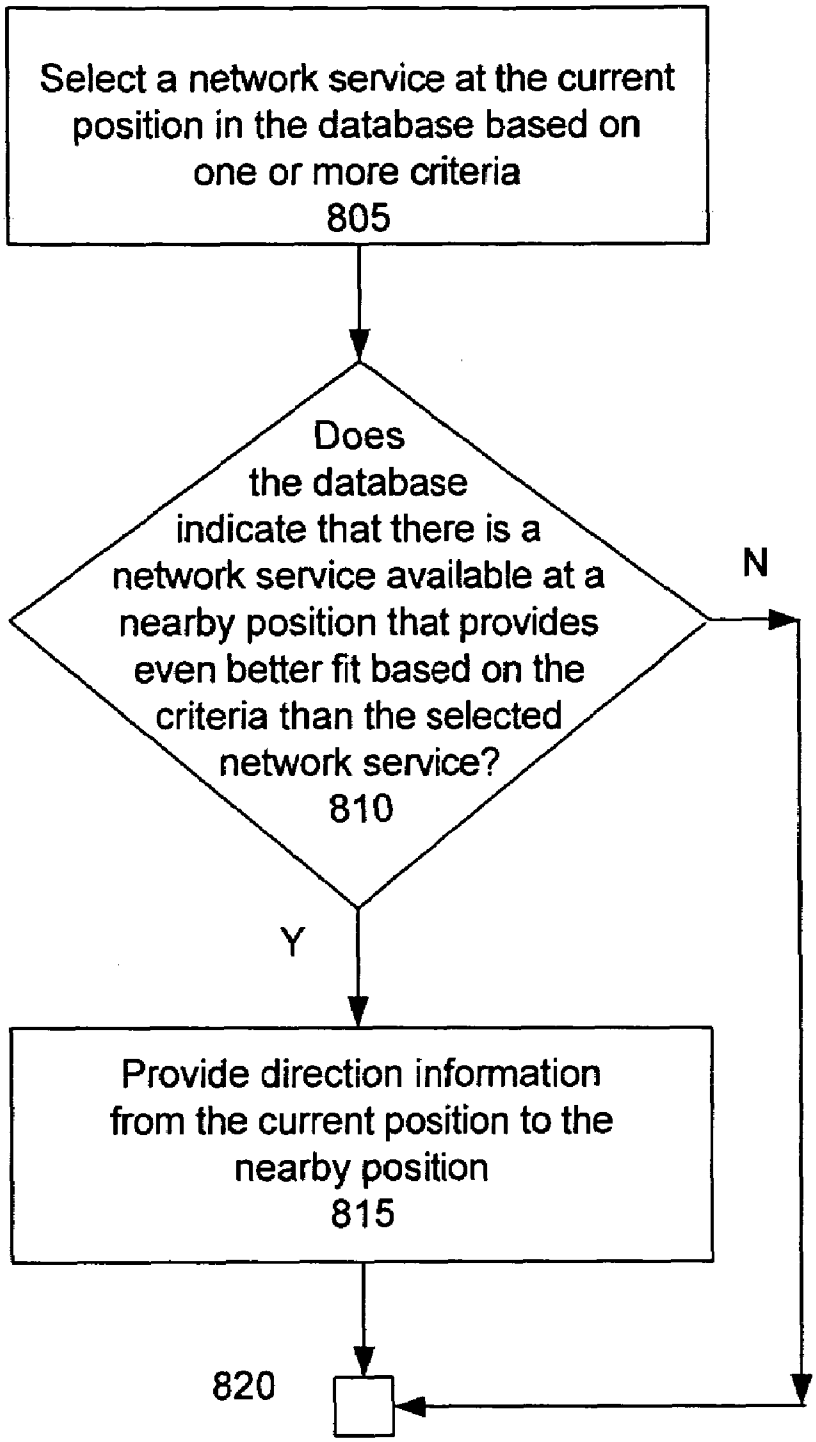
FIG. 8 is a flow diagram illustrating one example of a process that provides choices of available positions, according to one embodiment.

FIG. 8 is a flow diagram illustrating one example of a process that provides choices of available positions, according to one embodiment. It may be possible that there may be many different network services available within a certain geographic location, but not all may be available from a particular position. Thus it may be possible to move the computer system 200 a short distance and discover a different set of available network services. At block 805, the service selection logic selects a network service provided by the database from the current position based on one or more criteria. At block 810, a test is made to determine if, according to the database, there may be another position nearby where a different network service may be available and, at the same time, may be a better fit based on the one or more criteria. A better fit may include, for example, providing a connection at an even lower cost than the selected network service. From block 810, if there is such a nearby position, the process flows to block 815 where direction to the nearby position may be provided. Of course, the user of the computer system 200 may choose to stay with at the current position and use the selected network service. This provides the user an option to move to a new position or to stay at the current position. The process continues to block 820. From block 810, when there is no such nearby position, the process flows to block 820.

Figure 9:
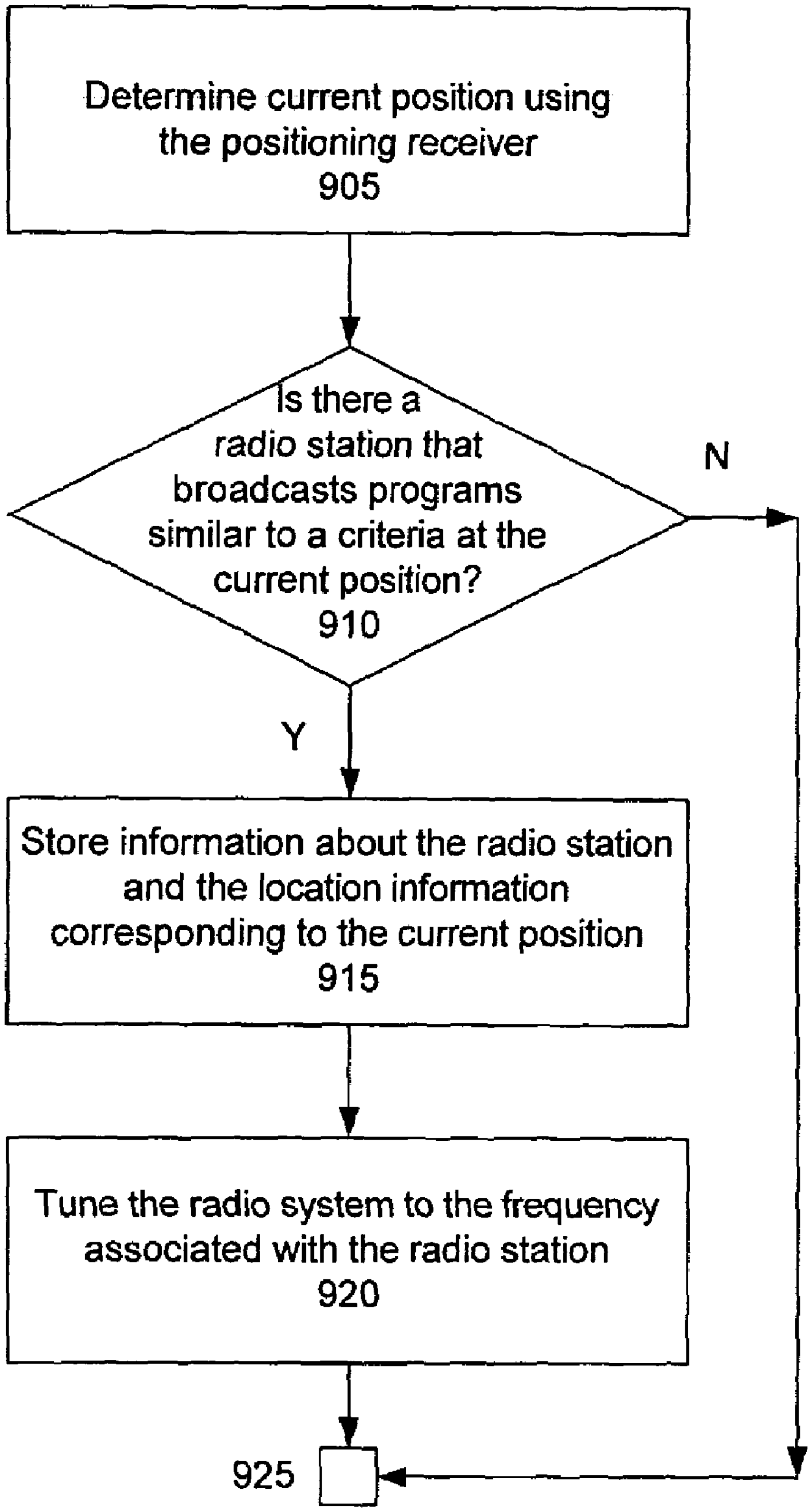
FIG. 9 is a flow diagram illustrating one example of a process that stores desired programming and associated location information, according to one embodiment.

FIG. 9 is a flow diagram illustrating one example of a process that stores desired programming and associated location information, according to one embodiment. This process may be used with RDS-enabled radio system as described above. At block 905, location information corresponding to a current position is determined using a positioning receiver. A user of the RDS-enabled radio system may provide one or more desired programming criteria (e.g., country music, etc.). The programming criteria may also be learned automatically by monitoring the type of programs that the RDS-enabled radio system is frequently tuned to. At block 910, a test is made to determine if there is a radio station that broadcasts programs that match with the one or more criteria. This may be done by screening the RDS information broadcast by the radio stations and received by the RDS-enabled radio system from the current position. When a radio station is detected to offer programs that match with the one or more criteria, the process flows from block 910 to block 915 where the information about the radio station and the location information corresponding to the current position are stored. The storing of the information may be done locally at the RDS-enabled radio system. Alternatively, the storing of the information may be done remotely at a shared database so that other radio systems may access it. At block 920, the RDS-enabled radio system is tuned to the detected radio station. The process continues to block 925. From block 910, if no radio station is detected to offer the desired programming, the process flows to block 925.

Figure 10:
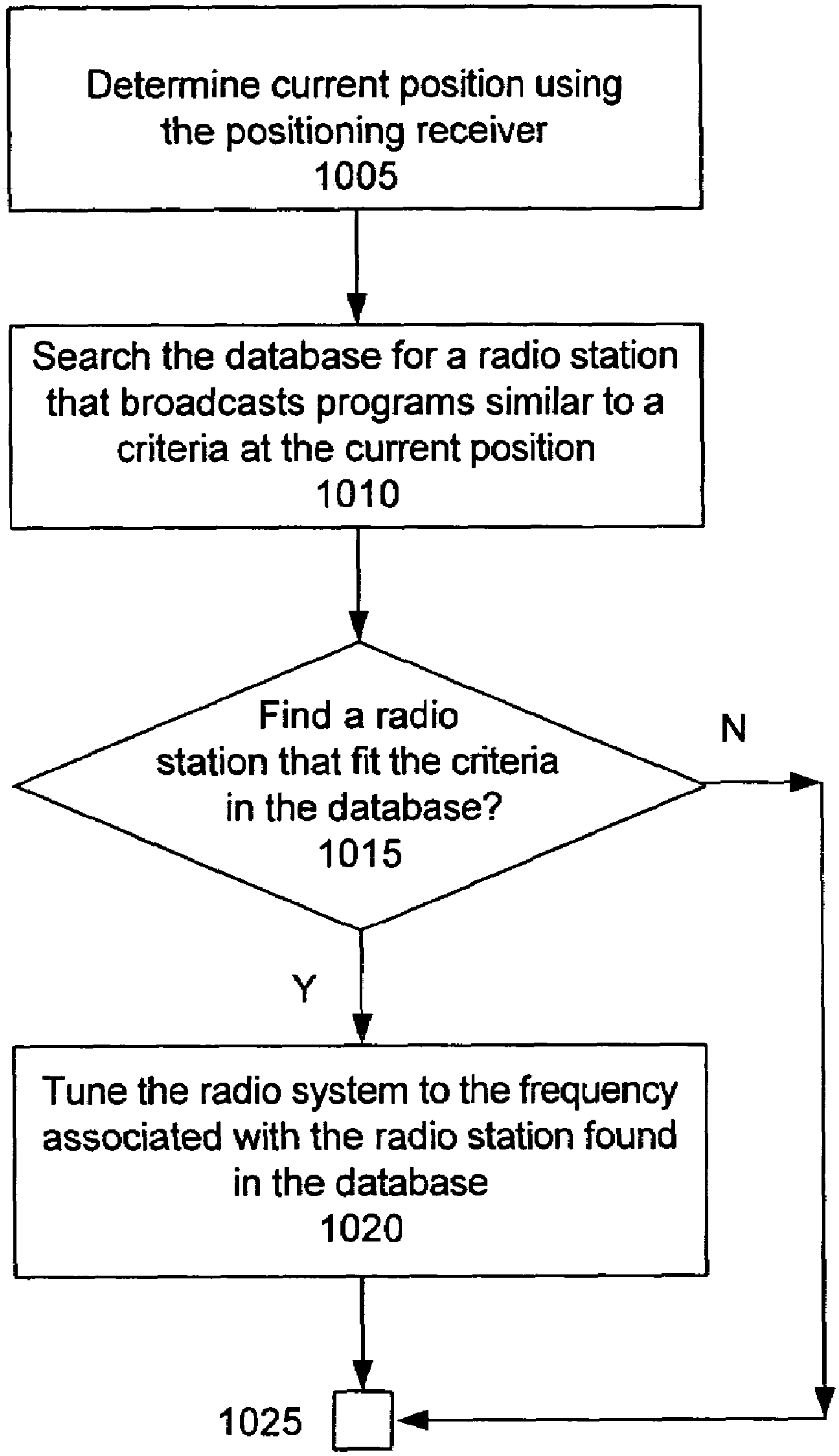
FIG. 10 is a flow diagram illustrating one example of a process that selects a radio station from a database based on one or more criteria and based on location information, according to one embodiment.

FIG. 10 is a flow diagram illustrating one example of a process that selects a radio station from a database based on one or more criteria and based on location information, according to one embodiment. At block 1005, location information corresponding to a current position is determined using a positioning receiver. At block 1010, the database is searched to find a radio station that offers programs matching the one or more criteria from the current position. At block 1015, a test is made to determine if the search result is successful. If it is, the process flows to block 1020 where the radio system is tuned to the radio station. The process continues at block 1025. From block 1015, if no radio station is found, the process flows to block 1025. For one embodiment, if no radio station is found using one criterion (e.g., country music), the process may flow from block 1015 to block 1010 and a different criterion (e.g., news talk radio) may be used to search for a radio station.

The operations of these various methods may be implemented by a processor in a computer system, which executes sequences of computer program instructions which are stored in a memory which may be considered to be a machine-readable storage media. For example, the computer system may be the computer system 200 or the radio system 400. The memory may be random access memory (RAM), read only memory (ROM), a persistent storage memory, such as mass storage device or any combination of these devices. Execution of the sequences of instruction causes the processor to perform operations according to one embodiment the present invention such as, for example, the operations described in FIGS. 5–10.

A method and an apparatus for using a positioning system to associate location information with desired services have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed:

1. A method, comprising:

determining location information corresponding to a first geographic location using a positioning system at a first time;

discovering one or more services available at the first geographic location;

associating the discovered one or more services with the location information;

storing information about the discovered one or more services and the associated location information in a storage device;

retrieving information about a service from the storage device using the location information corresponding to the first geographic location at a second time: and using the location lnformation to recommend a second geographic location when the second geographic location is associated with one or more services fitting a criteria better than the one or more services associated with the first geographic location.

2. The method of claim 1, wherein the positioning system is a global positioning satellites (GPS) system.

3. The method of claim 1, wherein the one or more services includes network services.

4. The method of claim 1, wherein the one or more services includes radio broadcast information.

5. A computer readable medium containing executable instructions which, when executed in a processing system, causes the processing system to perform a method comprising:

discovering one or more services available at a first geographic location at a first time determining location information of the first geographic location;

storing information about the discovered one or more services and the location information in a database;

when positioned at the first geographic location at a second time, retrieving information about a service fitting a criteria from the database using the location information of the first geographic location; and when there exists a second geographic location nearby that offers one or more services fitting the criteria better than the first geographic location, suggesting the second geographic location.

6. The computer readable medium of claim 5, wherein the criteria includes one or more of cost, bandwidth, and signal strength.

7. A system, comprising:

a positioning receiver to determine location information corresponding to a first geographic location during a first time period;

a storage device to store information about a network service identified by a discovery process at the first geographic location during the first time period; and a service selection logic to select a network service during the second time period at the first geographic location without repeating the discovery process, and to suggest an alternate geographic location, when the alternate geographic location is better than the first geographic location base on predetermined criteria.

8. The system of claim 7, wherein the positioning receiver is associated with a global positioning satellites (GPS) system.

9. The system of claim 8, wherein the network service includes a radio broadcast information.

10. The system of claim 8, wherein the network service includes a wireless communication service.

11. The system of claim 7, wherein the discovery process is configured to identify the network service at the geographic location during the first time period based on the predetermined criteria.

* * * * *